Figure 1:
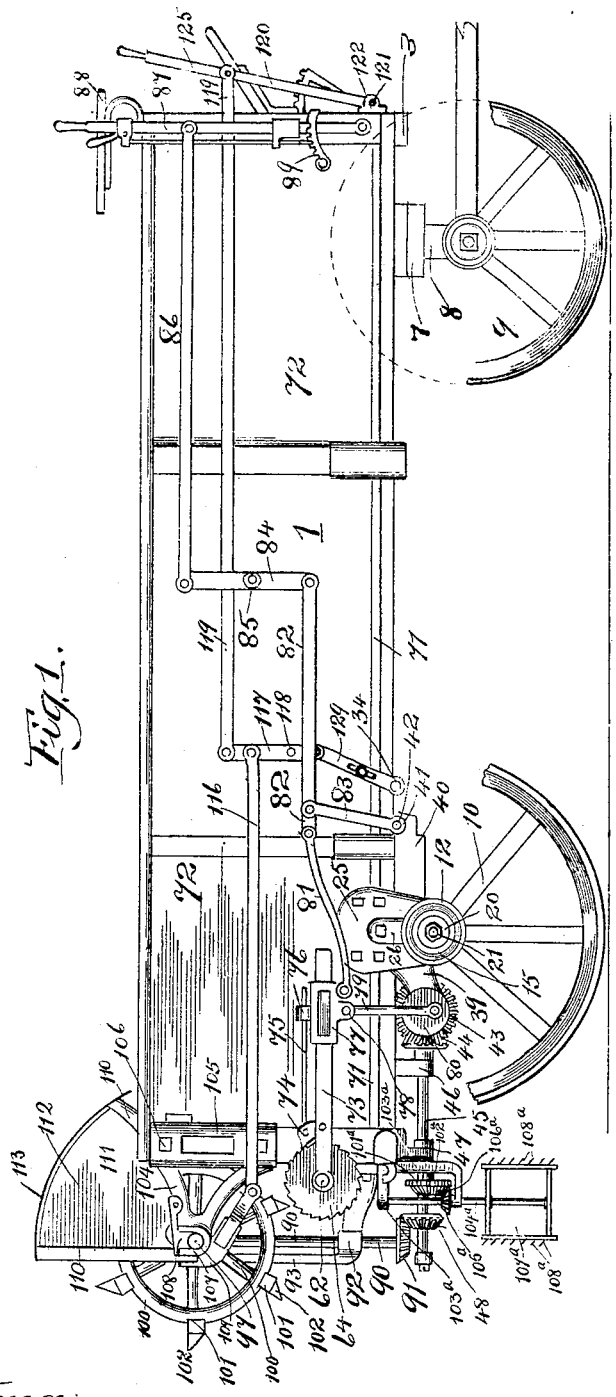

No. 805,199. PATENTED NOV. 21, 1905.
J. HAISH.
MANURE SPREADER.
APPLICATION FILED DEC. 20, 1904.

4 SHEETS—SHEET 2.

Witnesses:
William P. Bond
Pierson W. Banning

Inventor
Jacob Haish
By Banning & Banning
Attys.

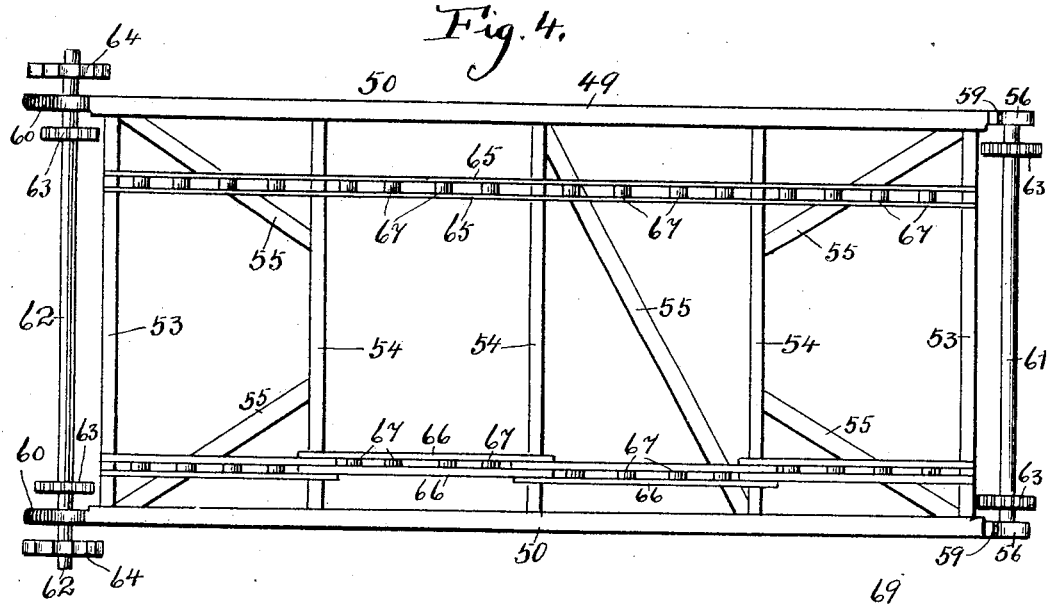
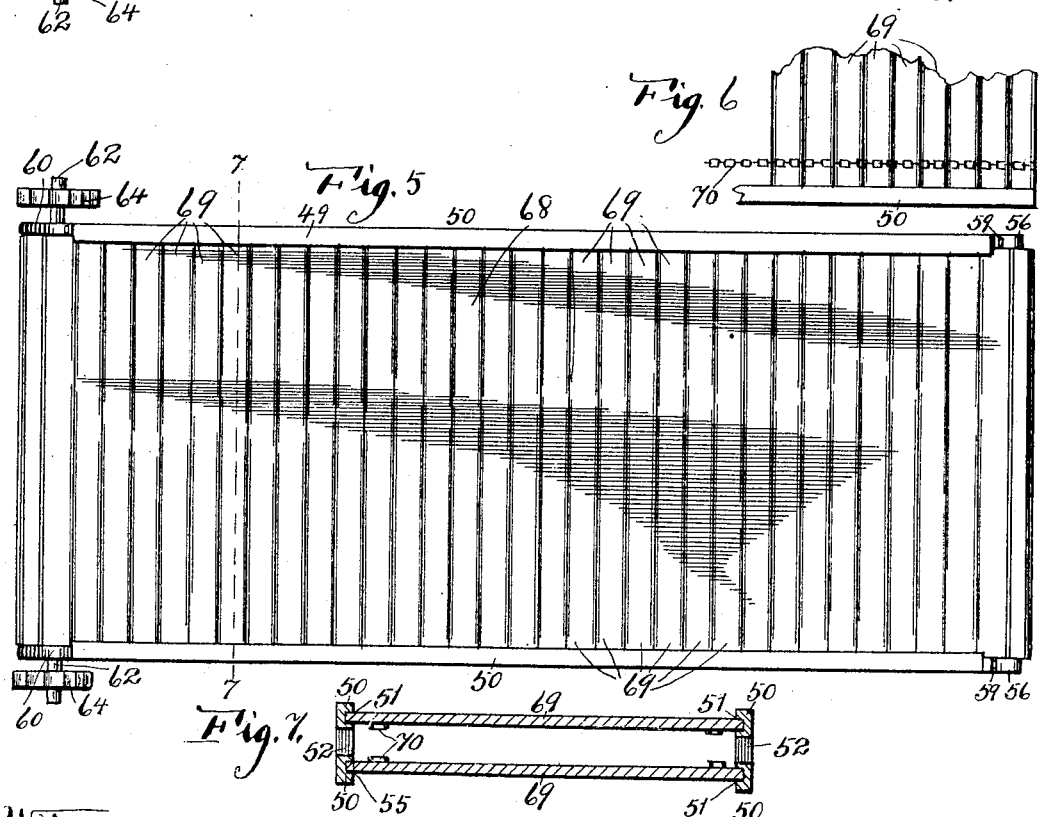

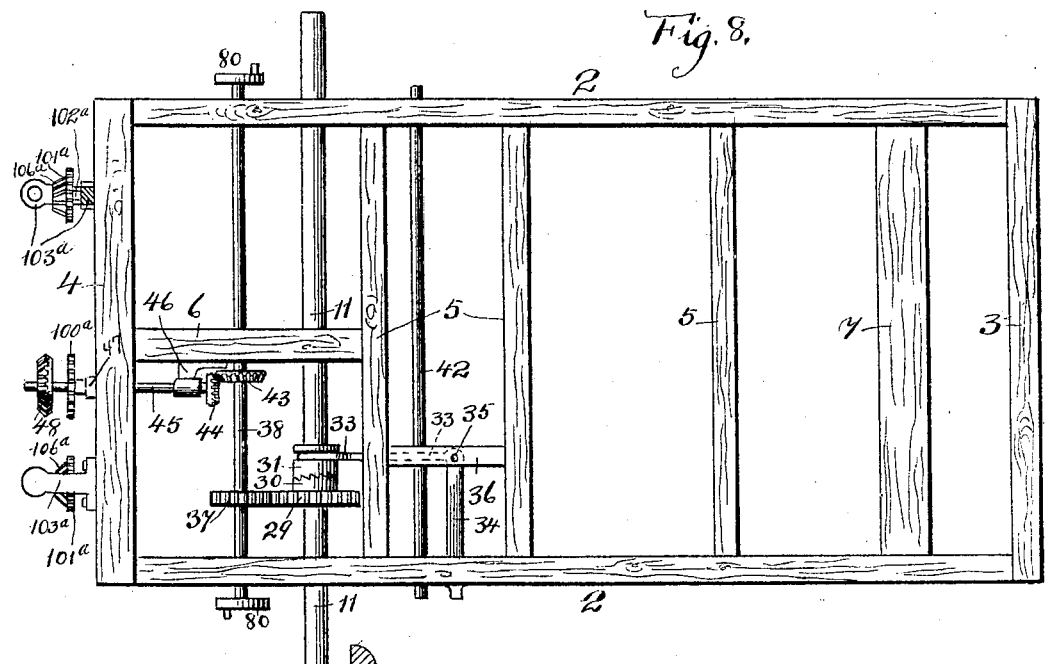

UNITED STATES PATENT OFFICE.

JACOB HAISH, OF DEKALB, ILLINOIS.

MANURE-SPREADER.

No. 805,199.　　　　Specification of Letters Patent.　　　　Patented Nov. 21, 1905.

Application filed December 20, 1904. Serial No. 237,687.

*To all whom it may concern:*

Be it known that I, JACOB HAISH, a citizen of the United States, residing at Dekalb, in the county of Dekalb and State of Illinois, have invented certain new and useful Improvements in Manure-Spreaders, of which the following is a specification.

This invention is intended to combine within itself a perfectly-regulated and easily-operable manure-spreader adapted to carry down and discharge the manure from a suitably-disposed wagon-body, the parts of which are so arranged as to be entirely under the control of the driver on the front seat, who will be enabled without moving his position to control and regulate the movement of a carrier-apron and rotary spreader and the power for actuating the same.

One of the objects of the invention is to so arrange and construct the operative parts that they may be easily assembled onto and removed from the wagon-body, thereby adapting the manure-spreader to act in the capacity of a farm-wagon when so desired without obstructing the wagon-body or decreasing its capacity by the presence of the manure-spreading mechanism.

Another object of the invention is to so mount and arrange the traveling apron that it can be quickly removed from the wagon-body when not in use, and the necessary operative mechanism, which is permanently constructed and secured to the wagon-body, will be so located and arranged as not to interfere in any way with the use of the device as a farm-wagon.

Another object of the invention is to so position the driving mechanism that it may be utilized when the wagon is at rest and the apron and rotary spreader removed for the purpose of rotating a buzz-saw, drill, or similar implement or for the purpose of raising hay, feed, or grain into a barn or similar structure.

Another object of the invention is to so arrange the driving-wheels of the spreader that motion will be imparted through a suitable clutch mechanism to the driving mechanism when the vehicle is being driven in a forward direction only without the necessity for reversing the movement of the mechanism when the wagon is being backed or turned, and a further object of the invention is to improve the construction and operation of the individual parts of the structure and improve the construction and operation of the structure as a whole, so that it will be enabled to perform its work with a small expenditure of power and with a high degree of rapidity and certainty; and the invention consists in the features of construction and combination of parts hereinafter described and claimed.

Figure 2:
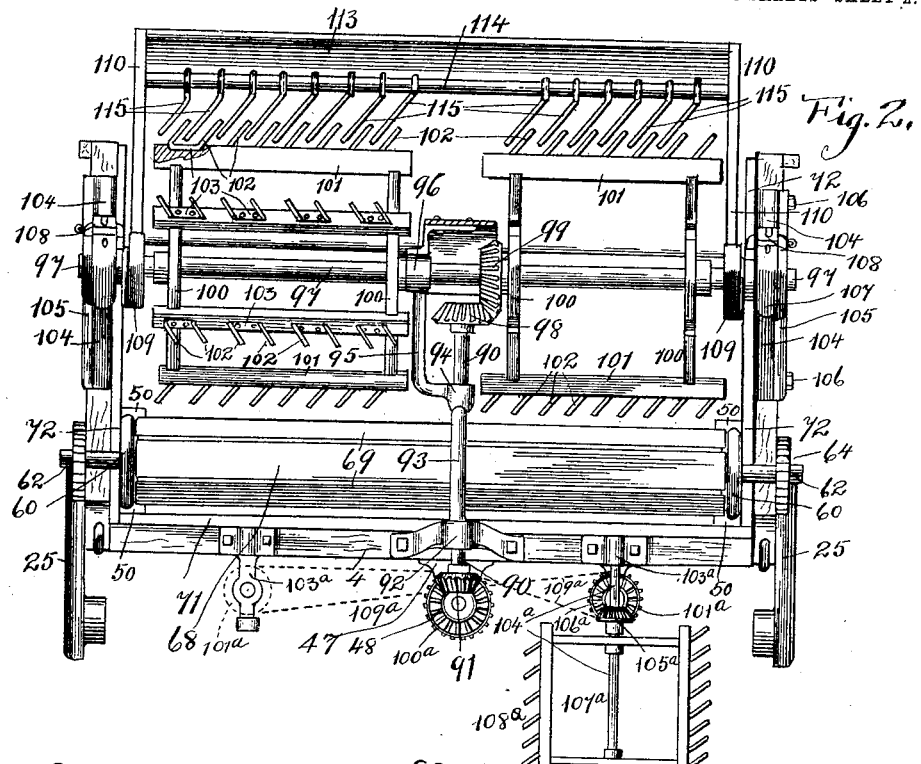
Figure 3:
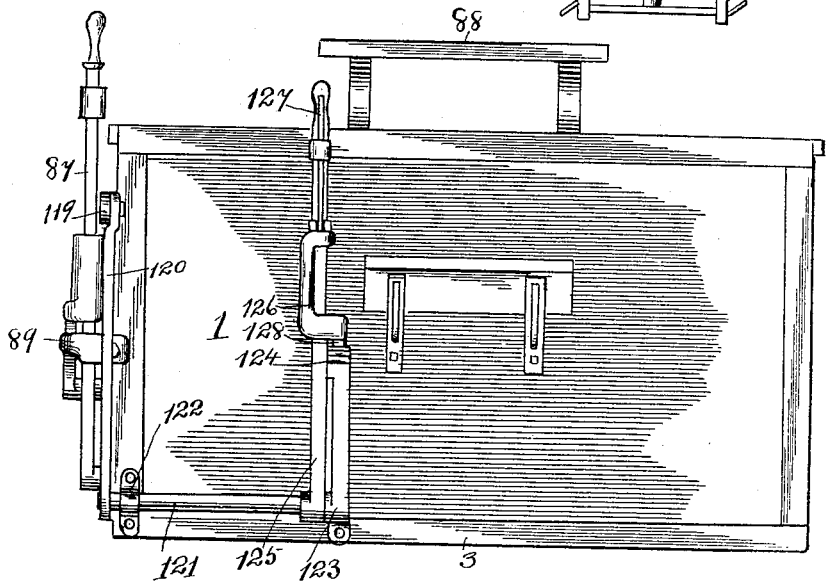

In the drawings illustrating the invention, Figure 1 is a side elevation of the manure-spreader in operative position; Fig. 2, a rear end elevation with the driving-wheels removed; Fig. 3, a similar forward end elevation; Fig. 4, a top or plan view of the apron-frame with the apron removed; Fig. 5, a similar view showing the apron in place; Fig. 6, a detail of the under face of the apron; Fig. 7, a cross-sectional view of the apron and frame, taken on line 7 7 of Fig. 5; Fig. 8, a plan view of the wagon-frame and gear mechanism; Fig. 9, an enlarged detail, partly in section, of the driving-shaft and one of the hubs of the driving-wheels; Fig. 10, a face view of the hub; Fig. 11, a view of the yoke for supporting the front wheels; Fig. 12, an end view of one of the journals thereon, and Fig. 13 an enlarged detail of the adjustable sprocket-wheels for carrying the traveling apron.

The manure-spreader is constructed to have a wagon-body 1, having a floor or framework consisting of side rails 2, a front cross-rail 3, a rear cross-rail 4, and intermediate cross-sills 5, and between the rear end cross-rail and the adjacent intermediate cross-sill is a longitudinally-extending sill 6, which serves to support the operative mechanism. The wagon-body is further provided with a cross-timber 7, to which is secured the forward axle-yoke 8, which is of course rotatably mounted to allow for the turning of the spreader. The forward yoke has secured thereto a pair of forward wheels 9, which act in combination with a pair of driving rear wheels 10, which latter are mounted on a driving-shaft 11 and are provided with hubs 12, each of which has in its outer face an annular recess 13, provided with clutch-teeth 14, and said hub is rotatably mounted on the end of the shaft and is intended to coöperate with a clutch member 15, which is keyed to the shaft by means of a key 16, which fits into an elongated slot 17 on the interior of the clutch member. The inner end face of the clutch member is provided with teeth 18, which coöperate with the teeth 14 on the hub for allowing the rotation of the driving-wheels to be imparted to the shaft when said wheels are moved in a forward direction, and the clutch member is further provided in its outer end with a deep annular recess 19, into which is fitted a cup 20, which is secured to the end of the shaft by means of a screw-bolt 21, and the annular recess 19 is of sufficient depth to allow the clutch member to be moved outwardly along the shaft against the tension of the spring 22, which is interposed between the clutch member and the cup and abuts against the end of the interior flange 23, which arrangement allows the clutch member to be outwardly projected by the contact of the teeth on the outer face of the hub when the driving-wheel is reversed, all the teeth projecting in one direction only, so that the rear wheels can be reversed without operating the driving-shaft. The inner end of the hub is provided with a flange 24, which abuts against a hanger 25, depending one on each side from the wagon-body, and the contact of the hub with the hanger is maintained by means of a plate 26, provided with an outwardly-projecting flange 27, which straddles the flange 24 and enters an annular recess 28 between the flange and the body of the hub, thereby preventing movement of the hub along the shaft. The shaft has loosely mounted thereon a driving gear-wheel 29, provided with a clutching-hub 30, and said hub coöperates with a slidable clutch-collar 31, which is keyed to and revoluble with the shaft and is provided with a groove or recess 32 for the entrance thereinto of the forked end of an operating-lever 33, which is in the form of a bell-crank and terminates in an outwardly-projecting arm 34, the bell-crank being pivoted by means of a pivot 35 to a cross-bar 36, which is secured to the two adjacent rear transverse sills of the wagon-body.

The driving gear-wheel 29 meshes with a gear-wheel 37 on a shaft 38, which shaft is journaled at each end in bracket-plates 39, which straddle the driving-shaft and are provided at their forward ends 40 with recesses 41 for journaling a shaft 42, the function of which will be hereinafter explained. The shaft 38 is provided with a bevel-pinion 43, which meshes with a bevel-pinion 44 on a rearwardly-projecting shaft 45, which is journaled at its inner end by a bracket 46 and near its outer end by a bracket 47, depending from the wagon-frame, and near the outer end of the shaft is a bevel-pinion 49 for transmitting power to the rotary spreader.

Within the wagon-body is located an apron-frame 49, consisting of upper and lower side rails 50, provided with longitudinally-extending grooves or channels 51 on their inner faces, and said rails are connected together at suitable intervals by means of uprights 52 and are connected together by means of end rails 53 and cross-rails 54, the latter of which are reinforced by means of diagonal braces 55, as best shown in Fig. 4. To the forward end of the frame are secured adjustable journal-mountings 56, (best shown in Fig. 13,) each of which is provided with a dowel-pin 57, entered into a recess 58 in the forward end rail, and said adjustable journal-mountings are adapted to be retracted by means of screw-threaded studs 59, which abut against the end of the apron-frame and when screwed forward force back the journal-mounting 56, thereby permitting the apron to be tightened when so desired. At the rear end of the frame are journal-plates 60, which are preferably of sufficient size to form a protection against the entrance of manure into the interior of the traveling apron. Within the journal-mountings heretofore mentioned are rotatably mounted a forward shaft 61 and a rear shaft 62, each of which is provided with sprocket-wheels 63, and the rear of which is provided at its outer ends with ratchet-wheels 64, adapted to impart rotation to the rear shaft. The top of the apron-frame has located thereon longitudinally-extending rails 65, which may be continuous, as shown at the top of Fig. 4, or consisting of sections 66, arranged in staggered relation, as shown at the bottom of Fig. 4, and between the rails or rail-sections are located a series of rollers 67, which serve to facilitate the movement of the endless traveling apron. The traveling apron 68 consists of a series of cross bars or section 69, having their ends entered into and slidable within the slots or grooves 55 in the side rails of the apron-frame, and the sections or bars of the endless apron are connected on their under faces by means of endless chains 70, which pass over the sprocket-wheel 63 and serve to impart rotation to the traveling apron. The apron-frame and apron are adapted to be slid bodily into the wagon-body or removed therefrom and are adapted to rest against the floor 71 and abut against the side walls 72 of the wagon-body, and the apron-frame is of suitable size to extend from end to end of the wagon-body and have the ratchet-wheels 64 outwardly project from the sides of the wagon-body at the rear end thereof.

To the outwardly-projecting ends of the shaft 62 are journaled ratchet-arms 73, to each of which is pivoted a dog 74, from which projects a rod 75, entering through an ear 76 on a slidable collar 77, mounted on the arm 73, and said collar has depending therefrom ears 78, between which is pivoted a pitman 79, pivoted at its lower end to a cam-wheel 80, and it will be understood that the ratchet-arm, pitman, and connected parts are duplicated on each side of the wagon-body. The slidable collars 77 have secured thereto on each side a regulating-arm 81, pivoted to draw-bars 82, to which are pivoted oscillating arms 83, connected with the opposite ends of the shaft 42, so that the regulation of the operative mechanism on one side of the machine will be duplicated on the other side. The draw-bar 82 on one side of the machine is extended and connects with the lower end of an arm 84, pivoted at its center by means of a pivot 85, and the upper end of the arm 84 connects with a draw-rod 86, pivoted to an operating-lever 87 at the front end of the wagon-body and in suitable proximity to a seat 88, and the position of said lever is maintained by a rack 89, which holds the lever in adjusted position.

At the rear end of the wagon-body is a vertical shaft 90, at the lower end of which is a bevel-pinion 91, meshing with the bevel-pinion 48, and said shaft passes through a lower bracket 92, from which extends an upright bar 93, at the upper end of which is a vertical journal 94, from which projects a laterally-disposed vertically-extending arm 95, terminating at its upper end in a journal 96, through which extends a rotary shaft 97, which serves to operate the rotary spreader. The shaft 90 terminates at its upper end in a bevel-pinion 98, meshing with a bevel-pinion 99 on the shaft 97, and to said shaft are secured wheels 100, two on each side of the gear mechanism, to the rims of which wheels are secured cross-bars 101, to the outer faces of which are secured beveled teeth 102, which are arranged in pairs and are shaped in the form of outwardly-projecting flanges bent or turned at right angles to a connecting-plate 103, which is secured in any suitable manner to the cross-bars 101, and said teeth are of a length to rotate in suitable proximity to the traveling apron to discharge the manure carried down thereby.

The shaft 97 is journaled at its ends within brackets 104, which are formed integral with plates 105, which are secured to the rear end of the wagon-body by means of bolts 106, which permits the brackets and shaft carried thereby to be bodily removed from the wagon-body when it is desirable to transform the manure-spreader into a farm-wagon. The brackets terminate in U-shaped journal-boxes 107, into which the ends of the shaft are entered and secured by means of pivoted journal-blocks 108, which can be raised to permit of the removal of the shaft when so desired. Located between the brackets and outside of the wheels 100 are a pair of hanger-arms 109, which are supported by the shaft 97, and to said hangers are secured the frames 110 of a shield 111, which consists of segmental ends 112 and a rounded back 113 and is adapted to be raised to permit the discharge of manure and lowered to prevent such discharge, and said shield is of suitable size to inclose the rotary spreader-wheels. Extending transversely of the shield is a rod 114, from which depend a series of scraper-teeth 115, which project between the beveled teeth 102 and are adapted to prevent said teeth from becoming clogged up with manure when in use. One of the hanger-arms 109 has secured thereto a draw-bar 116, which forwardly projects and connects with a lever-arm 117, pivoted at the point 118, and to the upper end of said lever-arm is pivoted an operating draw rod or bar 119, which extends to the forward end of the manure-spreader and is pivoted to an arm 120, which arm is secured to a rock-shaft 121, as best shown in Fig. 3, which is journaled within a journal-box 122 at its outer end and at its inner end is journaled within a bracket 123 of segmental shape and provided at its upper end with a toothed rack 124. An operating-lever 125 is secured to the rock-shaft and is of sufficient length to be easily operable by the pressure from the front seat. The lever is provided with a slidable collar 126, adapted to be raised and lowered by a lever 127, and said collar is provided with a tooth 128, adapted to coact with the teeth 124 for regulating the position of the lever and the movement of the draw-bars. To the lower end of the lever-arm 117 is pivoted a link 129, which connects with the bell-crank clutch-operating lever 34 and is adapted to throw into engagement the clutch simultaneously with the retraction of the draw-bars and the raising of the shield.

On the shaft 45 is a main sprocket-wheel $100^a$, and on each side of said shaft are sprocket-wheels $101^a$, mounted on short shafts $102^a$, journaled in brackets $103^a$, secured to the cross-sill 4. The brackets serve to journal vertical shafts $104^a$, each having therein a bevel-pinion $105^a$, which mesh with pinions $106^a$ on the short journal-shafts. The vertical shafts have secured thereto rotary spreaders $107^a$, having teeth $108^a$, which serve to scatter the manure disintegrated from the apron. The sprocket-wheels $101^a$ receive rotation from the main sprocket-wheel through the medium of a sprocket-chain $109^a$, which is carried around the sprocket-wheels in such manner as to impart a reverse rotation thereto when in use.

The yoke 8, which serves to journal the forward wheels, is provided at each end with depending arms 130, from which project rigid axles 131, upon which are mounted the hubs 132 of the forward wheels 9. Each of the rigid axles has extending therethrough a bolt 133, screw-threaded on its outer end 134, and said bolts pass through square studs 135 on the outer face of each axle, and the hub at its outer end is provided with a deep recess 136, into which is entered a circular disk 137, which is recessed on its inner face to fit over the squared stud 132 and lock thereon against rotation, and the washer 137 is provided on its outer face with a circular recess into which fits a circular nut 139, provided with a squared stud 140 for permitting the nut to be turned, and said nut is screw-threaded onto the end 134 of the bolt 133 and holds the washer in place and at the same time is protected by the washer from the rotary friction of the hub, which would tend to displace it.

In operation with the spreading mechanism in place the manure is loaded into the wagon-body and onto the traveling apron preparatory to the operation of the machine. The draw-bar 116, which operates the shield, is thrown back to drop the shield and prevent the escape of manure. This operation of dropping the shield moves the bell-crank clutch-operating lever to disconnect the clutch, so that the manure-spreader may be driven to the proper place to discharge the manure with the operating mechanism at rest and the shield lowered down onto the traveling apron to prevent the escape of the manure. When it is desirable to set the machine in motion, the lever 125 is drawn forward, which imparts a forward movement to the draw-bars 119 and 116, which latter connects with the shield, thereby raising up the shield out of contact with the traveling apron and opening a passage for the discharge of the manure. Simultaneously with the raising of the shield the clutch 131 will be thrown into engagement with the clutch member 130 and the rotation of the driving-shaft imparted through the gears 29 37 to the shaft 38, which in turn imparts rotation to the shaft 45 through the bevel-pinions 43 and 44, which rotation is imparted to the vertical shaft 90 through bevel-pinions 48 and 91, and the rotation of the vertical shaft is imparted to the shaft carrying the rotary spreader through the medium of the bevel-pinions 98 and 99. The rotation of the spreader serves to discharge the manure carried down by the traveling apron out of the rear of the vehicle. In order to start the movement of the traveling apron, the lever 87 is thrown forward, which imparts backward movement through the medium of the lever-arm 84 to the draw-bar 82 and the arm 81, which connects with the sliding collar 77 on the pivoted arm 73. This movement of the sliding collar serves to throw forward the dog 74 into a position to engage with the teeth of the ratchet 64 and impart an intermittent movement to the shaft 62 and the traveling apron actuated thereby. This intermittent movement of the shaft 62 is effected through the medium of the shaft 38, having on its end the wheels 80, to each of which is secured a pitman 79, which serves to rock the pivoted arm 73 up and down to bring the dog into engagement with successive teeth of the ratchet-wheel. The rock-shaft 42 serves to impart a similar movement to the mechanism on the opposite side of the spreader, which, however, is preferably connected up so that the dogs on the opposite sides of the machine will be alternately rather than simultaneously brought into engagement with the ratchet-teeth. This arrangement serves to double the speed of the traveling apron, although it is obvious that both of the dogs may be regulated to engage with the teeth simultaneously in order to reduce the speed of the traveling apron. As the manure is discharged it is caught by the rotary spreaders at the end of the device and scattered on both sides, which enables a wider area or swath to be covered each trip.

When it is desirable to utilize the device as a farm-wagon, the brackets 104 and 92 can be removed, and with them the shield and rotary spreader, and when said parts have been removed the rachet-operating mechanism can be likewise removed and the traveling-apron frame and apron withdrawn from the wagon-body. The withdrawal of the apron will of course make available the space hitherto occupied thereby, so that the capacity of the vehicle as a farm-wagon will be at a maximum and its use in said capacity will not be interfered with by the presence of the manure-spreading mechanism. The method of supporting the traveling apron on an independent removable frame enables it to be withdrawn as a whole from the wagon without interfering in any way with the wagon structure, and said removal can be much more quickly and easily effected than if the traveling apron were mounted within the wagon-body itself. After the manure-spreading mechanism has been removed the shafts and gearing which are formed integral with and a permanent part of the wagon-body may be utilized to drive a buzz-saw or drill secured to the shaft 45, or a pulley-wheel can be mounted thereon for the purpose of raising grain, hay, or feed into a barn or similar structure. When used in the latter capacity, the wagon-body must of necessity be raised at its rear end to lift the rear wheels 10 out of contact with the ground, after which power may be imparted to the clutch member 15 on the hub, the smooth surface of which peculiarly fits it to serve as a belt-wheel in connection with a gasolene-engine or similar motor. When operated in this manner, the driving-wheels 10 will serve in the capacity of balance or fly wheels to insure a continuous and uninterrupted rotation of the driving-shaft.

The clutch mechanism employed in connection with the hubs of the driving-wheels insures a perfect transmission of power when the wheels are traveling forward, but automatically releases the clutch and allows the driving-shaft to remain stationary when the vehicle is being backed, so that the manure-spreading mechanism is relieved from any unnecessary strain incident to the turning and backing of the vehicle.

From the above description it will be seen that the device as a whole is one which is peculiarly suited to the needs of those engaged in farming, in that the vehicle may be used as a strong and durable farm-wagon at all times when it is unnecessary to utilize it as a manure-spreader, thereby greatly increasing its field of usefulness and enabling it to be used by persons not desirous of possessing a manure-spreader which will be useless for any other purpose.

Although the invention has been described with considerable particularity as to details, it is obvious that the mechanical features herein described can be modified without departing in any way from the spirit of the invention.

What I regard as new, and desire to secure by Letters Patent, is—

1. In a manure-spreader, the combination of a vehicle-body having a solid floor, an apron-carrying frame adapted to be removably inserted into the vehicle-body and be supported thereby, journals at opposite ends of the frame, sprocket-wheels on the journals, an endless traveling apron carried by the sprocket-wheels and adapted to travel in the removable frame and be supported thereby out of contact with the floor, a driving-shaft, driving-wheels on the end of the driving-shaft, and means for imparting rotation from the driving-shaft to one of the apron-carrying journals, substantially as described.

2. In a manure-spreader, the combination of a vehicle-body having a horizontal floor, an apron-carrying frame adapted to be removably inserted into the vehicle-body and lie horizontally upon and be supported by the floor, journals at opposite ends of the frame, sprocket-wheels on the journals, an endless traveling apron passing around the sprocket-wheels and adapted to travel around from end to end of the frame within the bottom of the vehicle-body and out of contact with the floor, driving-wheels secured to the wagon-body, and means for imparting rotation from the driving-wheels to one of the apron-carrying journals, substantially as described.

3. In a manure-spreader, the combination of a vehicle-body, an apron-carrying frame adapted to be inserted into and removed from the vehicle-body, journals at opposite ends of the frame, sprocket-wheels on the journals, an endless traveling apron carried by the sprocket-wheels, a driving-shaft, drive-wheels on the end of the driving-shaft, a gear-wheel on the driving-shaft, a secondary shaft, a gear-wheel thereon meshing with the first-mentioned gear-wheel, a pitman at the end of the secondary shaft, a rocking arm pivoted to one of the apron-carrying journals, a ratchet-wheel secured to the said journal, a dog on the rocking arm adapted to engage with the ratchet-wheel, and means for throwing the dog into and out of engagement with the ratchet-wheel, substantially as described.

4. In a manure-spreader, the combination of a vehicle-body, an apron-carrying frame adapted to be inserted into and removed from the vehicle-body, journals at opposite ends of the frame, sprocket-wheels on the journals, an endless traveling apron carried by the sprocket-wheels, a driving-shaft, drive-wheels on the end of the driving-shaft, means for imparting rotation from the driving-shaft to one of the apron-carrying journals, a rotary spreader in suitable proximity to the traveling apron, a shield adapted to be lowered onto and raised up from the traveling apron, means for imparting rotation to the rotary spreader, and means for raising and lowering the shield, substantially as described.

5. In a manure-spreader, the combination of a vehicle-body, an apron-carrying frame adapted to be inserted into and removed from the vehicle-body, journals at opposite ends of the frame, sprocket-wheels on the journals, an endless traveling apron carried by the sprocket-wheels, a driving-shaft, drive-wheels on the end of the driving-shaft, a gear-wheel on the driving-shaft, a secondary shaft, a gear-wheel thereon meshing with the first-mentioned gear-wheel, a pitman at the end of the secondary shaft, a rocking arm pivoted to one of the apron-carrying journals, a ratchet-wheel secured to the said journal, a dog on the rocking arm adapted to engage with the ratchet-wheel, means for throwing the dog into and out of engagement with the ratchet-wheel, a rotary spreader in suitable proximity to the traveling apron, a shield adapted to be lowered onto and raised up from the traveling apron, means for imparting rotation to the rotary spreader, and means for raising and lowering the shield, substantially as described.

6. In a manure-spreader, the combination of a vehicle-body, a traveling apron in the vehicle-body, sprocket-wheels on which the traveling apron is mounted, journals carrying the sprocket-wheels, a ratchet-wheel on one of the journals, a driving-shaft, means for imparting intermittent rotation from the driving-shaft to the ratchet-wheel, a rearwardly-extending shaft adapted to receive rotation from the driving-shaft and provided on its rear end with a bevel-pinion, a vertically-extending shaft provided on its lower end with a bevel-pinion meshing with the first-mentioned bevel-pinion a bevel-pinion on the upper end of the vertically-extending shaft, a rotary spreader-shaft extending transversely of the vehicle-body and provided with a bevel-pinion meshing with the last-mentioned bevel-pinion, and spreader-wheels on the spreader-shaft provided with teeth in suitable proximity to the traveling apron, substantially as described.

7. In a manure-speader, the combination of a vehicle-body, a traveling apron in the vehicle-body, sprocket-wheels on which the traveling apron is mounted, journals carrying the sprocket-wheels, a ratchet-wheel on one of the journals a driving-shaft, means for imparting intermittent rotation from the driving-shaft to the ratchet-wheel, a rearwardly-extending shaft adapted to receive rotation from the driving-shaft and provided on its rear end with a bevel-pinion, a vertically-extending shaft provided on its lower end with a bevel-pinion meshing with the first-mentioned bevel-pinion, a bevel-pinion on the upper end of the vertically-extending shaft, a rotary spreader-shaft extending transversely of the vehicle-body and provided with a bevel-pinion meshing with the last-mentioned bevel-pinion, spreader-wheels on the spreader-shaft provided with teeth in suitable proximity to the traveling apron, a shield hung onto the spreader-shaft, and means for raising and lowering the shield, substantially as described.

8. In a manure-spreader, the combination of a vehicle-body, a traveling apron in the vehicle-body, sprocket-wheels on which the traveling apron is mounted, journals carrying the sprocket-wheels, a ratchet-wheel on one of the journals, a driving-shaft, means for imparting intermittent rotation from the driving-shaft to the ratchet-wheel, a rearwardly-extending shaft adapted to receive rotation from the driving-shaft and provided on its rear end with a bevel-pinion, a vertically-extending shaft provided on its lower end with a bevel-pinion meshing with the first-mentioned bevel-pinion, a bevel-pinion on the upper end of the vertically-extending shaft, a rotary spreader-shaft extending transversely of the vehicle-body and provided with a bevel-pinion meshing with the last-mentioned bevel-pinion, spreader-wheels on the spreader-shaft provided with teeth in suitable proximity to the traveling apron, and brackets removably secured to the vehicle-body within which brackets the spreader-shaft is journaled, substantially as described.

9. In a manure-spreader, the combination of a traveling apron, a horizontal rotary spreader at the rear end of and above the traveling apron, a transversely-extending shaft upon which the rotary spreader is mounted, provided near its center with a bevel-pinion, a vertically-extending shaft provided at its upper end with a bevel-pinion meshing with the first-mentioned bevel-pinion, a power-shaft, a rearwardly-extending shaft adapted to be actuated by the power-shaft, a bevel-pinion on the rearwardly-extending shaft, a bevel-pinion at the lower end of the vertically-extending shaft meshing with the bevel-pinion on the rearwardly-extending shaft, a sprocket-wheel on the rearwardly-extending shaft, two rotary spreaders on opposite sides of and below the vertically-extending shaft, and sprocket-chains for imparting rotation to the lower spreaders, substantially as described.

10. In a manure-spreader, the combination of a traveling apron, a horizontal rotary spreader at the rear end of and above the traveling apron, a transversely-extending shaft upon which the rotary spreader is mounted, provided near its center with a bevel-pinion, a vertically-extending shaft provided at its upper end with a bevel-pinion meshing with the first-mentioned bevel-pinion, a power-shaft, a rearwardly-extending shaft adapted to be actuated by the power-shaft, a bevel-pinion on the rearwardly-extending shaft, a bevel-pinion at the lower end of the vertically-extending shaft meshing with the bevel-pinion on the rearwardly-extending shaft, a sprocket-wheel on the rearwardly-extending shaft, two vertically-extending shafts on opposite sides of and below the first-mentioned vertically-extending shaft, bevel-pinions on the last-mentioned shafts, rotary spreaders secured to the last-mentioned shafts, bevel-pinions meshing with the bevel-pinions thereof, and having sprocket-wheels connected therewith, and sprocket-chains passing over the sprocket-wheel on the rearwardly-extending shaft and adapted to impart rotation to all three of the spreaders simultaneously, substantially as described.

11. In a manure-spreader, the combination of a vehicle-body, an endless traveling apron rotatably mounted within the vehicle-body, a driving-shaft, driving-wheels on the end of the driving-shaft, a gear-wheel on the driving-shaft, a secondary shaft, a gear-wheel thereon meshing with the first-mentioned gear-wheel, a rearwardly-extending shaft having on its inner end a bevel-pinion, a bevel-pinion on the secondary shaft meshing therewith, a bevel-pinion on the end of the rearwardly-extending shaft, a horizontally-mounted rotary spreader in suitable proximity to the apron, a vertically-extending shaft having on its lower end a bevel-pinion meshing with the bevel-pinion on the outer end of the rearwardly-extending shaft, said vertically-extending shaft being adapted to impart rotation to the horizontally-mounted rotary spreader, two vertically-mounted spreaders below the horizontally-mounted rotary spreader, sprocket-wheels adapted to drive the last-mentioned spreaders, a sprocket-wheel on the rearwardly-extending shaft, and a sprocket-chain connecting the respective sprocket-wheels, substantially as described.

JACOB HAISH.

Witnesses:
C. H. SALISBURY,
W. H. COLBURN.